Nov. 25, 1958　　L. D. THORLOUGH SMITH,　　2,861,760
QUICK RELEASE SEPARATING LINK FOR EJECTION SEAT HARNESS
Filed May 5, 1955　　　　　　　　　　　　　　　　2 Sheets-Sheet 1
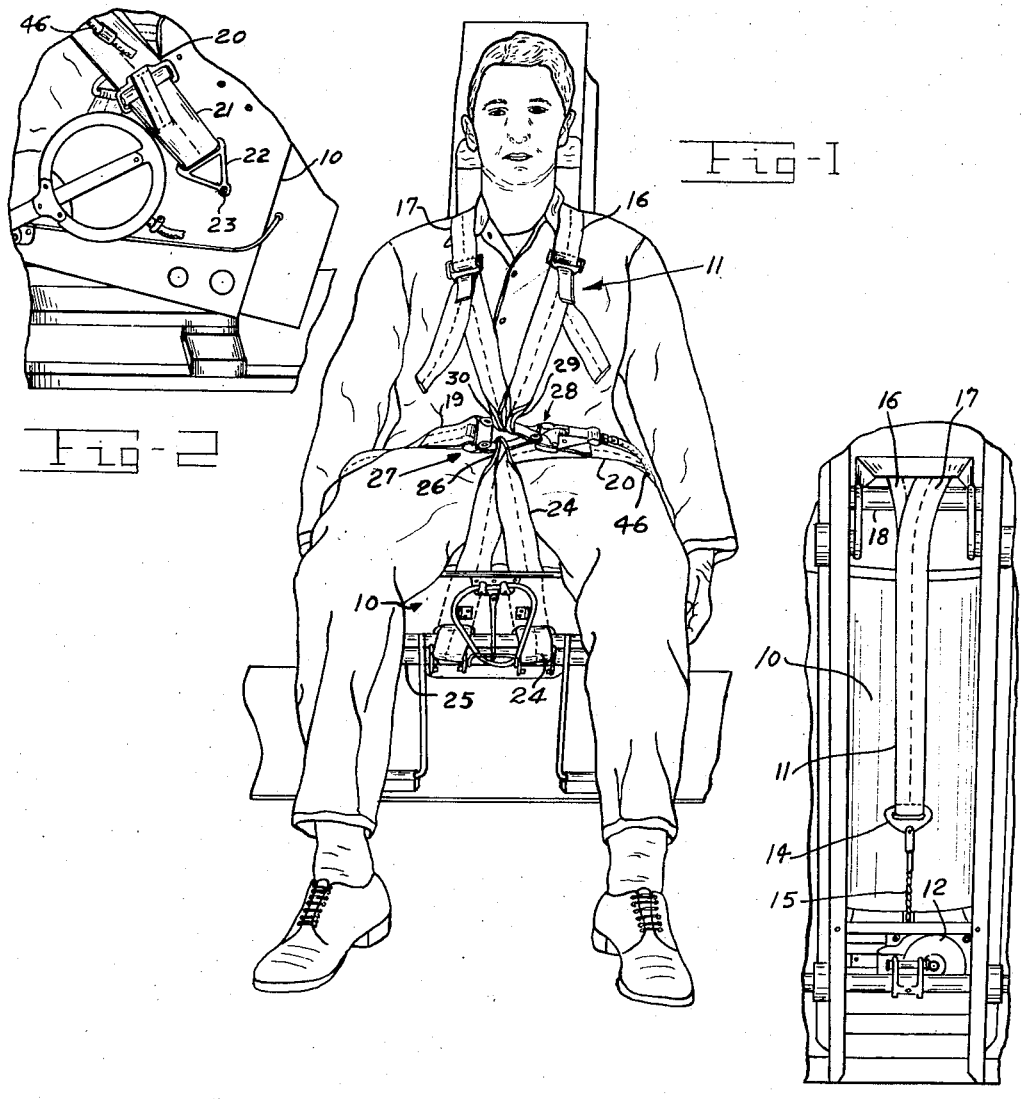
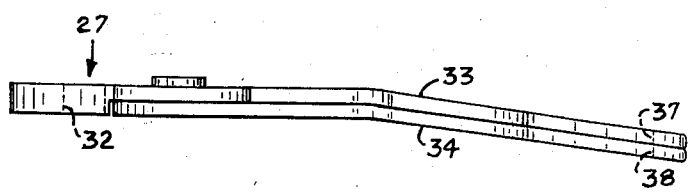
INVENTOR.
L. D. THORLOUGH SMITH
BY
ATTORNEYS Nov. 25, 1958  L. D. THORLOUGH SMITH  2,861,760
QUICK RELEASE SEPARATING LINK FOR EJECTION SEAT HARNESS
Filed May 5, 1955  2 Sheets-Sheet 2
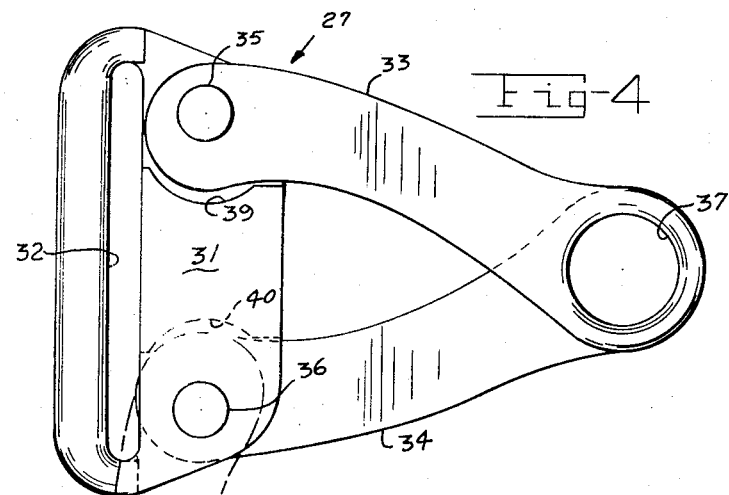
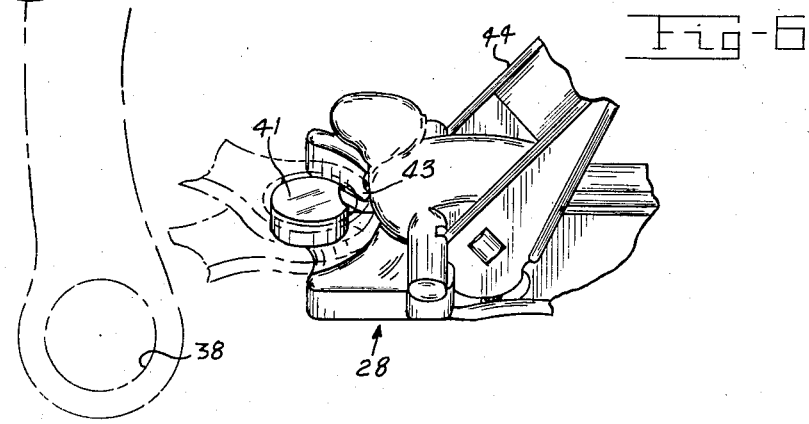
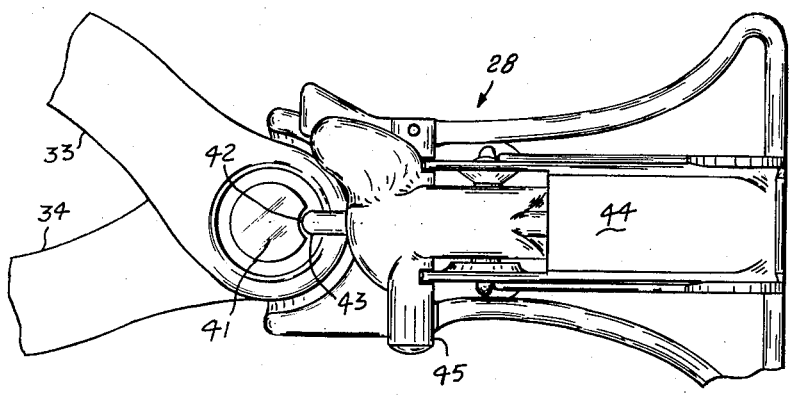
INVENTOR.
L. D. THORLOUGH SMITH
BY Wade Koonty
Frank C. Leach
ATTORNEYS United States Patent Office 2,861,760
Patented Nov. 25, 1958

2,861,760

QUICK RELEASE SEPARATING LINK FOR EJECTION SEAT HARNESS

L. D. Thorlough Smith, Springfield, Ohio, assignor to the United States of America as represented by the Secretary of the Air Force Application May 5, 1955, Serial No. 506,395

3 Claims. (Cl. 244—122)

(Granted under Title 35, U. S. Code (1952), sec. 266)

The invention described herein may be manufactured and used by or for the United States Government for governmental purposes without payment to me of any royalty thereon.

This invention relates to safety harness apparatus and, more particularly, to a quick release mechanism for safety harness apparatus.

If the occupants of an aircraft desire to escape therefrom during an emergency, one manner of such escape is by an ejection seat. In this method of escape, the occupant of the aircraft is secured to the seat in such a manner that he is ejected with the seat, which is propelled from the aircraft by suitable mechanism. In the upward escape seat there is no problem of the occupant arising from the seat since the seat rises upward. However, in downward ejection seats there is a problem of the occupant staying with the seat since the seat is ejected at a speed greater than that caused by the pull of gravity.

Accordingly, suitable harness apparatus must be provided to hold the occupant of the seat in contact with the ejection seat during its downward propulsion. In the upward ejection seats, the occupant is normally held in the seat by means of a lap safety belt extending across the abdomen of the occupant and shoulder straps extending downward over each of the shoulders of the wearer and secured to the lap safety belt by suitable means. This same safety harness apparatus is employed in the downward ejection seat but a tie-down strap, which extends from the seat upward between the occupant's legs, is also employed to hold the occupant against the seat when it is propelled downwardly. This tie-down strap is secured to the lap safety belt by suitable means.

When the ejection seat has cleared the aircraft, it is desired to release the occupant therefrom so that he may float to the ground by parachute. In order that the occupant may be released from the seat in the quickest manner possible, it is necessary that all portions of the safety harness apparatus be released from each other substantially simultaneously. In the upward ejection seat, the link that connects the portions of the lap safety belt includes a single pivotal arm to which the shoulder straps are secured. Upon release of the locking mechanism, the single arm is pivoted upwardly by the force of the shoulder straps so that all of the portions of the safety harness are released simultaneously.

However, in the downward ejection seat, this single arm would not permit simultaneous release since the tie-down strap exerts a downward force while the shoulder straps exert an upward force. The present invention solves this problem of substantially simultaneously releasing all parts of the safety harness apparatus by providing the link with two pivotal arms with the shoulder straps exerting their upward force on the upper pivotal arm of the link and the tie-down strap exerting its downward force on the lower pivotal arm of the link. Thus, the present invention permits the occupant of a downward ejection seat to be held securely to the seat during the downward propulsion and to be released therefrom as quickly as possible after the seat has cleared the aircraft by a predetermined distance.

The primary object of the present invention is to provide a mechanism for quickly releasing an occupant of an aircraft from a safety restraint harness.

Other objects of this invention will be readily perceived from the following description.

This invention relates to the combination of an ejection seat having a shoulder harness secured to one end with straps of the shoulder harness extending from the seat downwardly over the shoulders and to the front of a wearer. A lap safety belt includes two portions with one end of each portion secured to the seat. A tie-down strap is also secured to the seat and extends upwardly between the legs of the wearer. A connecting link, which includes a pair of pivotally mounted arms, has the free end of one of the portions of the lap safety belt secured thereto. The free end of the other portion of the lap safety belt is secured to a locking means, which includes a fastening member connected to the releasable ends of the arms to releasably secure the portions of the belt together to extend the belt across the abdomen of the wearer. The free ends of the shoulder straps are connected to one of the arms of the connecting link and the free end of the tie-down strap is connected to the other arm. When the locking means is actuated to release the fastening member, the arms are free to pivot and the wearer is completely freed from the belt, the shoulder harness, the tie-down strap and the seat.

The accompanying drawings illustrate the preferred embodiment of the invention, in which Figure 1 is a perspective view of the safety harness apparatus including the release link of the present invention illustrating a wearer being retained in an ejection seat;

Figure 2 is a fragmentary side elevational view of a portion of the ejection seat;

Figure 3 is a fragmentary rear elevational view of the ejection seat;

Figure 4 is a plan view of the release link showing one of the arms swung outwardly to release position in dot and dash lines;

Figure 5 is a side elevational view of the link of Figure 4;

Figure 6 is a fragmentary perspective view of a portion of the link and its locking mechanism the link being shown in dot and dash lines; and Figure 7 is a plan view of a portion of the link and its locking mechanism parts being broken away.

Referring to the drawings and particularly Figure 1, there is shown an ejection seat 10 upon which the occupant of an aircraft is seated. A shoulder harness 11 (see Figure 3) is secured to the ejection seat 10 by means of a spring loaded retractable inertia reel 12, which is rotatably mounted on the seat. The shoulder harness has an end fitting 14 attached to a steel cable 15, one end of which passes around the reel 12. The shoulder harness 11 includes a pair of straps 16 and 17 that extend over the shoulders of the wearer, as shown in Figure 1. A support bar 18 is provided on the upper portion of the back of the seat to support the shoulder harness 11 (see Figure 3).

A lap safety belt, which includes portions 19 and 20, extends about the abdomen of the wearer. One end of each of the portions 19 and 20 is secured to the seat 10. The connection of the portion 20 of the lap safety belt to the seat 10 is shown in Figure 2. One end of the portion 20 is secured to one end of a member 21 that has a triangular portion 22 at the other end. The triangular portion 22 is secured to the seat by suitable means such as a bolt 23. A similar type of connection is provided to secure the portion 19 to the other side of the seat 10.

A tie-down strap 24 extends between the legs of the wearer to maintain the occupant of the aircraft against the seat during its downward ejection. The ends of the tie-down strap 24 are secured to the seat by a bar 25. The center of the tie-down strap has a looped portion 26 connected to a portion of a connecting link 27, which is secured to the portion 19 of the lap safety belt. This connecting link 27, as shown in Figures 4 and 5, cooperates with a locking mechanism 28, as shown in Figures 6 and 7, which is secured to the free end of the portion 20 of the lap safety belt. The shoulder straps 16 and 17 have looped free end portions 29 and 30, respectively, that are releasably secured to the connecting link 27. Thus, all the portions of the safety restraint harness have their free ends connected together by the connecting link 27 and its locking mechanism 28.

Referring to Figure 4, the connecting link 27 consists of a base 31 having a slot 32 therein through which the free end of the portion 19 of the lap safety belt is secured. A pair of arms 33 and 34 is pivotally connected to the base 31 at 35 and 36, respectively. The arm 33 to which the looped portions 29 and 30 of the shoulder straps 16 and 17 are secured is considered the upper arm while the arm 34 to which the looped portion 26 of the tie-down strap 24 is secured is considered the lower arm of the connecting link. The releasable ends of the arms 33 and 34 have openings 37 and 38 respectively, which are aligned when the arms are in the retaining position shown in Figure 4 in full lines. The openings 37 and 38 are held in their aligned position by the locking mechanism 28 when it is desired to secure the free ends of the safety restraint harness. When the locking mechanism 28 releases the connection of the arms 33 and 34, the downward force exerted by the tie-down strap 24 rotates the arm 34 through an angle greater than 90° to the dot-dash line position shown in Figure 4. Obviously, this will free the tie-down strap 24 from the connecting link 27. Similarly, the upward force of the shoulder straps 16 and 17 rotates the arm 33 through an angle greater than 90° to a position similar to that shown in the dot-dash line position of the arm 34 whereby the shoulder straps 16 and 17 are released from the connecting link 27. The base 31 has a cutaway portion 39 on one side thereof to permit the rotation of the arm 33 to an angle greater than 90°. The opposite side of the base 31 has a similar cutaway portion 40 at the opposite end thereof to allow the arm 34 to be rotated at an angle greater than 90°.

The locking mechanism 28 includes a fastening member 41, which fits in the openings 37 and 38 of the arms 33 and 34 when the openings are aligned (see Figures 6 and 7) to hold the arms together. The fastening member 41 has a notch 42 therein in which a detent member 43 may be inserted. When this detent member 43 is inserted within the notch 42 (see Figure 7), the arms 33 and 34 are prevented from inadvertently being removed from their securing position by the detent member 43 overlapping the arms 33 and 34. The detent member 43 is moved into the notch 42 of the fastening member 41 by a lever 44 as shown in the reissue patent of Stanley, Re. 23,981, April 12, 1955, for example.

The lever 44 must be actuated to release the detent member 43 from the notch 42 so that the arms 33 and 34 are released from the fastening member 41. While this actuation of the lever 44 may be performed by hand, it has been found desirable to employ a propellent charge, as shown in the Stanley patent, to move the detent member 43 to insure that the detent member 43 is actuated within a predetermined time after the ejection seat has been propelled from the aircraft. This, of course, allows the occupant to be able to be ejected at comparatively low altitudes with safety. A tube 46 (see Fig. 2) is provided to carry the compressed gas to actuate the detent member 43. Since the particular type of locking mechanism is not an essential element of this invention, it will be understood that any other suitable locking mechanism could be employed, if desired; it is only necessary that a fastening member be employed to hold the free ends of the arms 33 and 34 together.

The present invention has the advantage of permitting safety resistant harness to be releasably secured together from four different directions with all of the free ends of the harness being released substantially simultaneously. This invention has the further advantage of insuring that the occupant of a downward ejection seat will be held tightly thereagainst during ejection but automatically freed from the seat upon clearing the aircraft.

For purposes of exemplification, the particular embodiment of the invention has been shown and described according to the best present understanding thereof. However, it will be apparent that changes and modifications in the arrangement and construction of the parts thereof may be resorted thereto without departing from the true spirit and scope of the invention.

I claim:

1. In combination, an ejection seat, a shoulder harness having one end secured to the seat, said shoulder harness including straps extending from the seat downwardly over the shoulders and to the front of a wearer, a lap safety belt, a tie-down strap secured to the seat and extending upwardly between the legs of the wearer, said lap safety belt comprising two portions, one end of each portion of said belt being secured to said seat, a connecting link including a base, said base having a slot extending lengthwise thereof, the other end of one of said portions of said belt being disposed in said slot to be secured to said connecting link, an arm pivotally mounted on one end of said base, a second arm pivotally mounted on the other end of said base, each of said arms having an opening in the end remote from said base, locking means secured to the other end of the other portion of said belt, said locking means including a fastening member disposed in said openings of said arms when said openings are aligned to releasably secure the portions of the belt together whereby the belt extends across the abdomen of the wearer, the free ends of said shoulder straps being connected to one of said arms of said connecting link, the free end of said tie-down strap being connected to the other arm of said connecting link, actuation of said locking means releasing said fastening member to completely free the wearer from said belt, said shoulder harness, said tie-down strap, and said seat.

2. In combination, an ejection seat, a shoulder harness having one end secured to the seat, said shoulder harness including straps extending from the seat downwardly over the shoulders and to the front of a wearer, a lap safety belt, a tie-down strap secured to the seat and extending upwardly between the legs of the wearer, said lap safety belt comprising two portions, one end of each portion of said belt being secured to said seat, a connecting link including a base, the other end of one of said portions of said belt being secured to said base, an arm pivotally mounted on one end of said base, a second arm pivotally mounted on the other end of said base, each of said arms having an opening in the end remote from said base, locking means secured to the other end of the other portion of said belt, said locking means including a fastening member disposed in said openings of said arm when said openings are aligned to releasably secure the portions of the belt together whereby the belt extends across the abdomen of the wearer, the free ends of said shoulder straps being connected to one of said arms of said connecting link, the free end of said tie-down strap being connected to the other arm of said connecting link, actuation of said locking means releasing said fastening member to completely free the wearer from said belt, said shoulder harness, said tie-down strap, and said seat.

3. In combination, an ejection seat, a shoulder harness having one end secured to the seat, said shoulder harness including straps extending from the seat downwardly over the shoulders and to the front of a wearer, a lap safety belt, a tie-down strap secured to the seat and extending upwardly between the legs of the wearer, said lap safety belt comprising two portions, one end of each portion of said belt being secured to said seat, a connecting link including a pair of pivotally mounted arms, each of said arms being pivotally mounted on the link at one of the arm's ends, the other end of the one of said portions of said belt being secured to said connecting link, locking means secured to the other end of the other portion of said belt, said locking means including a fastening member connected to a free end of each of said arms to releasably secure the portions of the belt together whereby the belt extends across the abdomen of the wearer, the free ends of said shoulder straps being connected to one of said arms of said connecting link, the free end of said tie-down strap being connected to the other arm of said connecting link, actuation of said locking means releasing said fastening member to completely free the wearer from said belt, said shoulder harness, said tie-down strap, and said seat.

References Cited in the file of this patent

UNITED STATES PATENTS

| | | |
|---|---|---|
| 2,494,207 | Sabbia | Jan. 10, 1950 |
| 2,701,693 | Nordmark et al. | Feb. 8, 1955 |
| 2,750,644 | Martin et al. | June 19, 1956 |
| 2,754,073 | Holm et al. | July 10, 1956 |

FOREIGN PATENTS

| | | |
|---|---|---|
| 219,980 | Great Britain | July 29, 1924 |
| 552,051 | France | Jan. 17, 1923 |